Sept. 11, 1934.　　　　C. NELSON　　　　1,973,442
PRESSURE COOKER
Filed Dec. 16, 1932　　2 Sheets-Sheet 1

Inventor
CARL NELSON
By Paul, Paul & Moore
ATTORNEYS

Sept. 11, 1934.                    C. NELSON                    1,973,442
                                PRESSURE COOKER
                             Filed Dec. 16, 1932            2 Sheets-Sheet 2

Inventor
CARL NELSON
By Paul, Paul Nelson
ATTORNEYS

Patented Sept. 11, 1934

1,973,442

UNITED STATES PATENT OFFICE 1,973,442

PRESSURE COOKER

Carl Nelson, Eau Claire, Wis., assignor to National Pressure Cooker Company, Eau Claire, Wis., a corporation of Wisconsin Application December 16, 1932, Serial No. 647,576

9 Claims. (Cl. 220—55)

This invention relates to new and useful improvement in pressure cookers and more particularly to a novel means for securing the cover to the cooker body.

An object of the invention is to provide a pressure cooker having a seat therein and a cover adapted to engage said seat, and means for securing said cover to the seat in leak-proof relation, said securing means requiring that the cover be relatively rotated upon the cooker body in the operation of positioning it thereon and removing it therefrom.

A further object is to provide in combination with a pressure cooker and its cover, a novel means for securing the cover to the cooker body in leak-proof relation, said securing means comprising a plurality of threaded elements supported in the cover and having portions adapted to engage the cooker body to secure the cover thereto, and said securing means cooperating with means on the cooker body to prevent the cover from being blown off the cooker, should said securing means accidentally be actuated to release the cover while the cooker is under pressure, and means being provided for moving the cover out of sealing engagement with its seat before it can be relatively rotated upon the cooker body to permit its removal therefrom.

Other objects of the invention reside in the simple and inexpensive construction of the means provided for securing the cover to the cooker; in the means for locking the cover against relative rotation upon the cooker body, when positioned in sealing engagement with said body and said securing means are released; and in the means provided for axially translating said cover to unseat it, before it can be relatively rotated upon the cooker body to remove it therefrom, after said securing means have been released.

The primary object of the invention, therefore, is to provide a novel cover-securing means, which is an improvement in some respects over the form shown in my pending application, Serial No. 507,641, filed January 9, 1931.

Other objects of the invention will appear from the following description and accompanying drawings, and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 6:
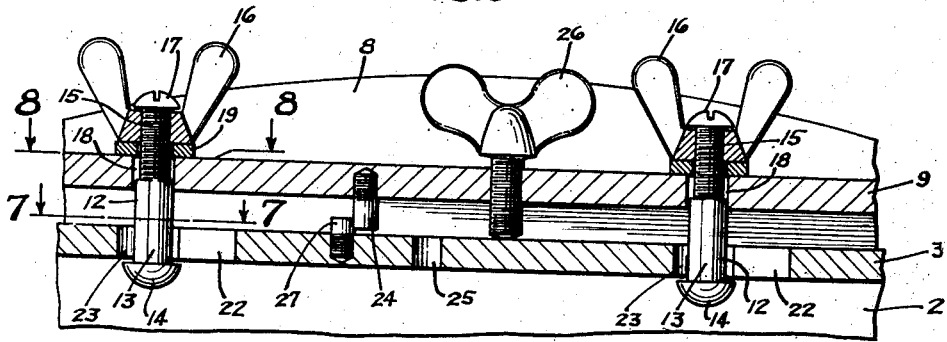
Figure 6 is a similar view showing the cover after having been relatively rotated upon the cooker body to permit its removal therefrom.
Figure 7:
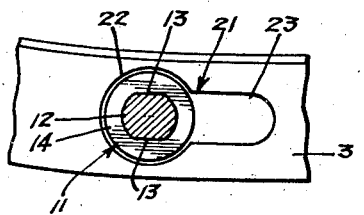
Figure 8:
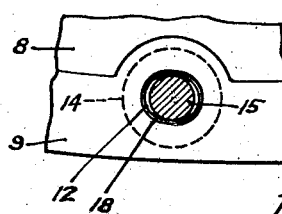

Figure 7 is a sectional plan view on the line 7—7 of Figure 6, showing one of the clamping elements or bolts alined with the enlarged portion of its complementary key slot; and Figure 8 is a sectional plan view on the line 8—8 of Figure 6, showing the means for preventing relative rotation of the clamping elements in their sockets, when being actuated to secure the cover to the cooker body or to release it therefrom.

Figure 1:
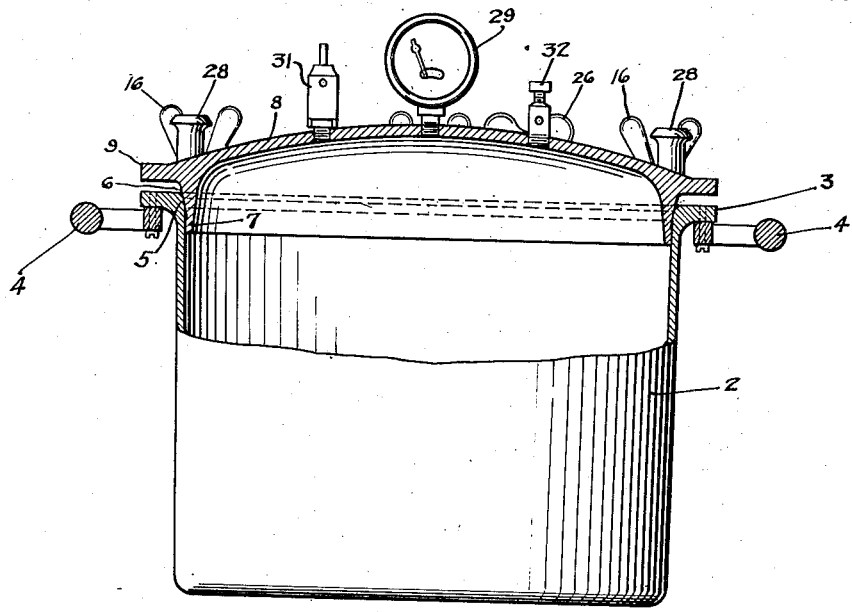
Figure 1 is a side elevation, partially in section, showing a pressure cooker with its cover seated thereon.

In the selected embodiment of the invention here shown, there is illustrated in Figure 1, for purposes of disclosure, a pressure cooker comprising a body 2, shown provided at its upper portion with an outwardly extending annular flange 3 to which a pair of suitable handles 4 may be secured. A tapered seat 5 is provided adjacent the upper edge of the body adapted to be engaged by a correspondingly tapered annular face 6 provided upon a depending flange 7 of a cover 8. The cover 8 has an annular flange or edge portion 9.

An important feature of this invention resides in the means provided for securing the cover 8 to the cooker body in leak-proof relation, and also whereby it cannot be blown off the cooker, should the securing means accidentally be actuated to release the cover while the cooker is under pressure.

The means for securing the cover to the cooker body is here shown as comprising a plurality of clamping bolts 11, all of which are alike in construction, and it will therefore be necessary to describe but one in detail. Each clamping bolt comprises a body portion 12 provided with oppositely disposed flat faces 13, as best shown in Figure 7. A suitable head 14 is provided at one end of the bolt and its opposite end portion 15 is threaded to receive a suitable wing nut 16. A screw 17 is secured to the terminal of the threaded end portion 15 to provide means for preventing the wing nut 16 from becoming separated from the clamping bolt, as will readily be understood by reference to Figures 3 and 6.

The clamping bolts 11 are loosely mounted in suitable apertures 18 provided in the annular flange 9 of the cover, and these apertures are elongated as shown in Figure 8 to prevent the bodies 12 of the bolts from relatively rotating therein, when the wing nuts 16 are actuated. Suitable washers 19 are shown interposed between the wing nuts 16 and the flange 9.

Figure 2:
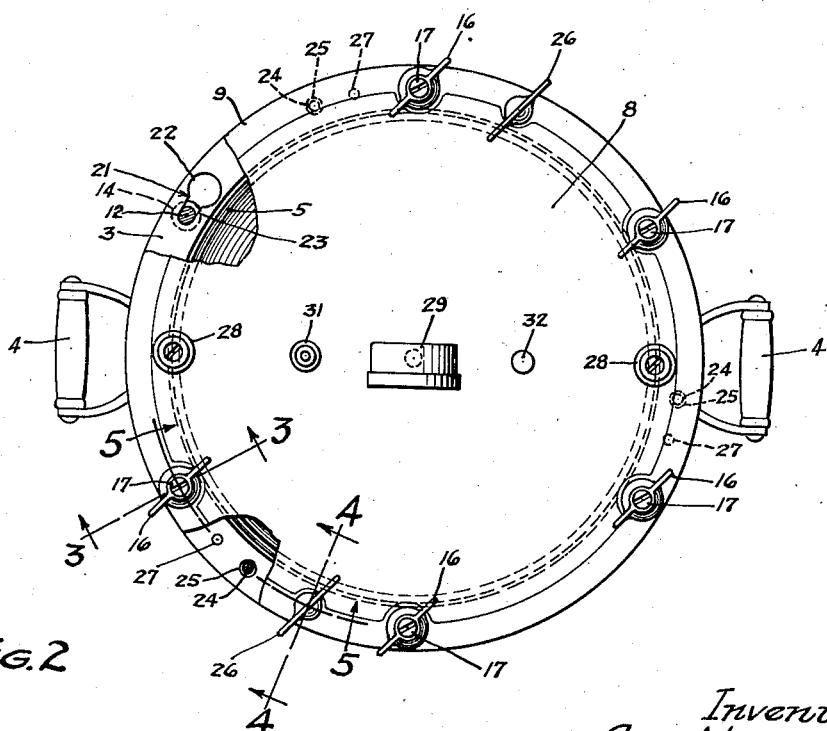
Figure 2 is a plan view of Figure 1, showing the means for securing the cover to the cooker body.
Figure 3:
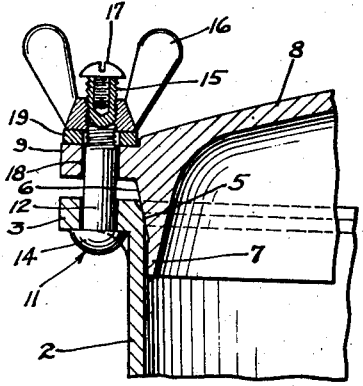
Figure 3 is an enlarged detail sectional view on the line 3—3 of Figure 2, showing the preferred construction of the clamping elements.
Figure 4:
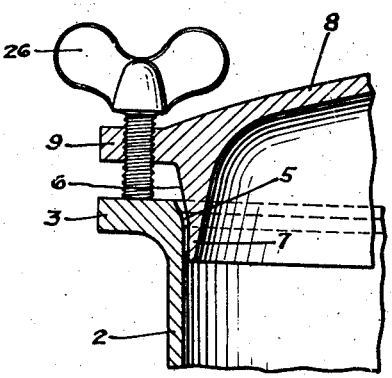
Figure 4 is a detail sectional view on the line 4—4 of Figure 2, showing a means for axially translating the cover to move it out of sealing engagement with its seat.
Figure 5:
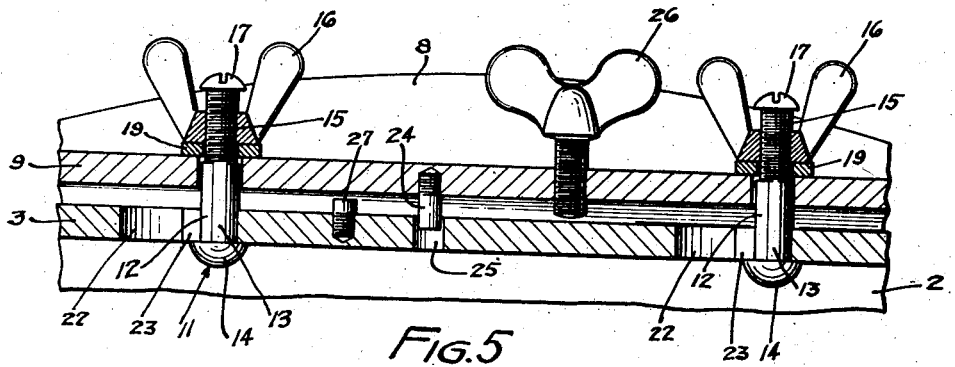
Figure 5 is a detail sectional view on the line 5—5 of Figure 2, showing the means for locking the cover against relative rotation upon the cooker body, when the cover is positioned in sealing engagement with said body.

A plurality of key slots 21 are provided in the flange 3 of the cooker body adapted to receive the clamping bolts 11, as clearly shown in Figures 3, 5, and 6. The enlarged portions 22 of the key slots 21 are of a size to permit the heads 14 of the clamping bolts to pass freely therethrough, as shown in Figure 7, and the restricted portions 23 of said slots are adapted to receive the body portions 12 of the bolts, as shown in Figure 2. In the drawings, I have shown six clamping bolts and a corresponding number of key slots 21, but it is to be understood that any suitable number of such devices may be employed, as may be desired.

When the cover is fitted onto the cooker body, the heads 14 of the clamping bolts pass through the enlarged portions 22 of the key slots, after which the cover is relatively rotated upon the cooker body to move the clamping bolts into the restricted portions 23 of the slots, as shown in Figure 2. When the bolts are thus positioned, and the wing nuts 16 are rotated in one direction, the heads 14 of the clamping bolts will engage the lower face of the cooker body flange 3, whereby the tapered face 6 of the cover flange will be moved into sealing engagement with the tapered seat 5 of the cooker body.

To remove the cover from the cooker, the wing nuts 16 are actuated to release the bolts 12, and the cover is then rotated in a clock-wise direction, when viewed as shown in Figure 2, to aline the heads 14 with the enlarged portions 22 of the key slots, after which the cover may be readily lifted off or completely removed from the cooker. The terminal screws 17 of the clamping bolts 12 prevent the wing nuts from becoming separated therefrom, as hereinbefore stated. By securing the cover to the cooker body, as above described, it will readily be noted that when the clamping bolts are actuated to release the cover, the latter cannot be blown off the cooker, should said bolts be released while the cooker is under pressure, because of the heads 14 of the bolts being engaged with the lower face of the flange 3 of the cooker body. The cover must therefore be relatively rotated upon the cooker to aline the heads 14 with the enlarged portions 22 of the slots 21 before it can be removed therefrom.

Means is provided whereby the cover cannot be relatively rotated upon the cooker body until it has been moved out of sealing engagement with the seat 5. Such means is best shown in Figures 5 and 6, and may consist of a plurality of pins or depending projections 24 provided upon the lower face of the flange 9 of the cover, which are adapted to be received in suitable sockets or apertures 25 provided in the flange 3 of the cooker body. When the cover is in sealing engagement with the seat 5, as shown in Figure 3, the pins 24 will be seated in the sockets 25, as shown in Figure 5, whereby it will readily be noted that the cover cannot be relatively rotated upon the cooker body until the cover has been vertically moved relatively thereto, to move the pins out of the sockets 25. To thus axially translate the cover to move the pins out of the sockets 25, suitable means such as thumb screws 26 may be provided in the flange 9 of the cover. The lower terminals of these screws are adapted to engage the flange 3 of the cooker body whereby when said screws are rotated in one direction, they will force the cover out of engagement with the seat 5 and relatively elevate it so as to move the pins out of the sockets 25. When the pins have thus been moved out of their respective sockets, the cover may readily be rotated in a clockwise direction to aline the heads 14 of the clamping bolts with the enlarged portions 22 of the key slots 21. Suitable stops 27 are shown provided upon the upper face of the flange 3 of the cooker body, adapted to be engaged by the pins 24 to limit relative rotation of the cover in one direction.

The cover is shown provided with the usual hand grips or knobs 28, pressure gage 29, safety valve 31, and manually operable pressure release valve 32. Before the cover is removed from the cooker, the valve 32 is usually opened to release the pressure in the cooker.

The pins or projections 24 and sockets 25 provide an important feature of this invention in that they positively prevent the cover from being relatively rotated upon the cooker body, when the clamping bolts have been actuated to release the cover, thereby making it necessary to unseat the cover before the clamping bolts can be alined with the enlarged portions 22 of the key slots. By thus unseating the cover before it can be rotated to a position to permit its removal from the cooker body, the pressure in the cooker will be released, so that when the heads 14 of the bolts 12 are alined with their respective enlarged portions 22 of the key slots, the cover cannot be blown off the cooker.

In the drawings, I have shown the means for relatively lifting the cover out of engagement with the seat 5 as consisting of a pair of thumb screws 26. It is to be understood, however, that other suitable means applicable for the purpose may be provided in lieu of the screws, and the particular arrangement of the clamping bolts and their construction may also be varied without departing from the scope of the invention.

I claim as my invention:

1. A pressure cooker comprising a body having a seat therein, a cover for said body having a portion adapted to engage said seat, clamping elements carried by the cover and engageable with means on the cooker body to force the cover into engagement with said seat, said elements and means requiring that the cover be relatively rotated upon the cooker body before it can be secured thereto or removed therefrom, and said elements and means also cooperating to prevent the cover from being blown off the cooker, should said clamping elements accidentally be actuated to release the cover while the cooker is under pressure, and means independent of said clamping elements for preventing relative rotation of the cover when in sealing engagement with said seat.

2. A pressure cooker comprising a body having a plurality of key slots in an upper portion thereof, a seat in said body, a cover for said body having a portion adapted to engage said seat, means for securing the cover in sealing engagement with said seat, comprising a plurality of clamping elements having heads adapted to be inserted through the enlarged portions of said slots, whereby when the cover is relatively rotated upon said body to cause said clamping elements to enter the restricted portions of said slots, said elements may be actuated to secure the cover to said seat, and means for preventing the cover from being moved into sealing engagement with said seat until it has been rotated to a predetermined position upon said body.

3. A pressure cooker comprising a body having an outwardly extending flange at its upper portion provided with a plurality of key slots, a seat in said body, a cover having a portion adapted to engage said seat, a plurality of clamping bolts mounted in said cover and having heads adapted to traverse the enlarged portions of said key slots and whereby, when the cover is relatively rotated upon said body, said bolts will enter the restricted portions of said slots after which they may be tightened to secure the cover in sealing engagement with said seat, depending projections on said cover adapted to interlock with means on said flange to prevent relative rotation of the cover on the cooker body, when in sealing engagement with said seat, and said bolts and key slots cooperating to prevent the cover from being blown off the cooker, should said clamping bolts accidentally be operated to release the cover while the cooker is under pressure.

4. A pressure cooker comprising a body having an outwardly extending flange at its upper portion provided with a plurality of key slots, a seat in said body, a cover having a portion adapted to engage said seat, a plurality of clamping bolts mounted in said cover and having heads adapted to traverse the enlarged portions of said key slots and whereby, when the cover is relatively rotated upon said body, said bolts will enter the restricted portions of said slots after which they may be tightened to secure the cover in sealing engagement with said seat, depending projections on said cover adapted to interlock with means on said flange to prevent relative rotation of the cover on the cooker body, when in sealing engagement with said seat, said headed bolts and key slots cooperating to prevent the cover from being blown off the cooker should said clamping bolts accidentally be operated to release the cover while the cooker is under pressure, and means for axially translating said cover to move it out of sealing engagement with said seat before it can be rotated to remove it from the cooker body.

5. A pressure cooker comprising a body having a seat therein and provided at its upper portion with a plurality of key slots, a cover having a portion adapted to engage said seat, a plurality of clamping elements movably supported in the cover and having heads adapted to be inserted through the enlarged openings of said key slots, said cover being arranged for relative rotation upon the cooker body to move said clamping elements into the restricted portions of said key slots, whereby when said elements are actuated, the cover will be moved into sealing engagement with the seat in the cooker body, and means for limiting relative rotation of the cover in one direction to aline said clamping elements with the enlarged portions of said key slots to thereby facilitate removal of the cover from the cooker body.

6. A pressure cooker comprising a body having a seat therein, a cover for the cooker body having a portion adapted to engage said seat, clamping elements on the cover engageable with means on the cooker body for securing the cover to said seat, said clamping elements requiring that the cover be relatively rotated upon the cooker body in one direction before it can be secured to said seat, and that it be rotated in the opposite direction before it can be removed from the cooker, and means for preventing the cover from sealingly engaging said seat until it has been relatively rotated to a predetermined position upon the cooker body.

7. A pressure cooker comprising a body having a seat therein, a cover for said body having a portion adapted to engage said seat, cooperating means on the cover and cooker body for securing the cover to the seat, and means for holding the cover out of sealing engagement with said seat and necessitating that said cover be rotated to a predetermined position upon the cooker body, before said securing means can be operated to secure the cover in sealing engagement with said seat.

8. A pressure cooker comprising a body having a seat therein, a cover for said body having a portion adapted to engage said seat, cooperating means on the cover and cooker body for securing the cover to the seat, and means for holding the cover out of sealing engagement with said seat and necessitating that said cover be rotated to a predetermined position upon the cooker body, before said securing means can be operated to secure the cover in sealing engagement with said seat, said last mentioned means also necessitating that the cover be raised to a partially open position before it can be rotated to permit its complete removal from the cooker.

9. A pressure cooker comprising a body having a seat therein, a cover for the cooker body having a portion adapted to engage said seat, clamping elements for securing the cover to said seat comprising means whereby the cover must be relatively rotated upon the cooker body before it can be secured thereto or removed therefrom, and cooperating means on the cover and cooker body requiring that the cover be moved out of engagement with said seat before it can be relatively rotated upon the cooker body to completely remove it therefrom.

CARL NELSON.